(12) United States Patent (10) Patent No.: US 8,266,961 B2
Kuang et al. (45) Date of Patent: Sep. 18, 2012

(54) INERTIAL SENSORS WITH REDUCED SENSITIVITY TO QUADRATURE ERRORS AND MICROMACHINING INACCURACIES

(75) Inventors: Jinbo Kuang, Acton, MA (US); John A. Geen, Tewksbury, MA (US)

(73) Assignee: Analog Devices, Inc., Norwood, MA (US)

(*) Notice: Subject to any disclaimer, the term of this patent is extended or adjusted under 35 U.S.C. 154(b) by 503 days.

(21) Appl. No.: 12/535,477

(22) Filed: Aug. 4, 2009

(65) Prior Publication Data
US 2011/0030474 A1 Feb. 10, 2011

(51) Int. Cl.
*G01C 19/56* (2006.01)
(52) U.S. Cl. ..................................... 73/504.16
(58) Field of Classification Search ............... 73/504.16
See application file for complete search history.

(56) References Cited

U.S. PATENT DOCUMENTS

| | | | |
|---|---|---|---|
| 2,309,853 A | 2/1943 | Lyman et al. | 33/204 |
| 2,513,340 A | 7/1950 | Lyman | 264/1 |
| 4,267,478 A | 5/1981 | Ljung et al. | 310/315 |
| 4,755,057 A | 7/1988 | Curby et al. | 356/350 |
| 4,884,446 A | 12/1989 | Ljung | 73/505 |
| 5,025,346 A | 6/1991 | Tang et al. | 361/283 |
| 5,034,905 A | 7/1991 | Widdau et al. | 364/606 |
| 5,275,047 A | 1/1994 | Zabler et al. | 73/505 |
| 5,349,855 A | 9/1994 | Bernstein et al. | 73/505 |
| 5,359,893 A | 11/1994 | Dunn | 73/505 |
| 5,392,650 A | 2/1995 | O'Brien et al. | 73/517 |
| 5,635,640 A | 6/1997 | Geen | 73/504.12 |
| 5,869,760 A | 2/1999 | Geen | 73/504.12 |
| 5,939,633 A | 8/1999 | Judy | 73/514.32 |
| 5,992,233 A | 11/1999 | Clark | 73/504.35 |
| 6,122,961 A | 9/2000 | Geen et al. | 73/504.12 |
| 6,370,954 B1 | 4/2002 | Zerbini et al. | 73/514.01 |
| 6,505,511 B1 | 1/2003 | Geen et al. | 73/504.12 |
| 6,553,833 B1 | 4/2003 | Funk et al. | 73/504.14 |
| 6,564,637 B1 | 5/2003 | Schalk et al. | 73/504.12 |
| 6,654,424 B1 | 11/2003 | Thomae et al. | 375/257 |
| 6,837,107 B2 | 1/2005 | Geen | 73/504.04 |
| 6,877,374 B2 | 4/2005 | Geen | 73/504.14 |
| 6,892,576 B2 | 5/2005 | Samuels et al. | 73/514.32 |
| 7,032,451 B2 | 4/2006 | Geen | 73/504.14 |
| 7,051,590 B1 | 5/2006 | Lemkin et al. | 73/504.04 |
| 7,421,897 B2 | 9/2008 | Geen et al. | 73/504.12 |
| 2004/0211257 A1* | 10/2004 | Geen | 73/504.04 |
| 2004/0211258 A1* | 10/2004 | Geen | 73/510 |
| 2005/0081633 A1* | 4/2005 | Nasiri et al. | 73/514.29 |
| 2005/0205959 A1 | 9/2005 | Chau et al. | 257/467 |
| 2006/0150745 A1 | 7/2006 | Lang | 73/849 |
| 2006/0201233 A1 | 9/2006 | Schroeder | 73/1.77 |
| 2008/0282833 A1 | 11/2008 | Chaumet | 74/5 R |

OTHER PUBLICATIONS

Geen et al., "New iMEMS® Angular—Rate—Sensing Gyroscope," Analog Dialogue 37-03, pp. 1-4 (2003). Saukoski, "System and Circuit Design for a Capacitive MEMS Gyroscope," Doctoral Dissertation, TKK Dissertations 116, Helsinki University of Technology, 279 pages (2008).
International Searching Authority, International Search Report—International Application No. PCT/US2010/043312, dated Nov. 2, 2010, together with the Written Opinion of the International Searching Authority, 9 pages.

* cited by examiner

*Primary Examiner* — Hezron E Williams
*Assistant Examiner* — Gregory J Redmann
(74) *Attorney, Agent, or Firm* — Sunstein Kann Murphy & Timbers LLP

(57) ABSTRACT

Inertial sensors with reduced sensitivity to quadrature errors and micromachining inaccuracies include a gyroscope incorporating two specially-configured single-axis gyroscopes for sensing rotations about two orthogonal axes (the axes of sensitivity) in the device plane, where each single-axis gyroscope includes a resonator having two rotationally-dithered shuttles interconnected by a fork and each shuttle is configured to tilt out-of-plane along a tilt axis perpendicular to the axis of sensitivity and includes corresponding Coriolis sensing electrodes positioned along an axis perpendicular to the tilt axis (i.e., parallel to the axis of sensitivity). The two single-axis gyroscopes may be interconnected, e.g., by one or more in-phase or anti-phase couplings interconnecting the forks and/or the shuttles.

26 Claims, 10 Drawing Sheets

INERTIAL SENSORS WITH REDUCED SENSITIVITY TO QUADRATURE ERRORS AND MICROMACHINING INACCURACIES

FIELD OF THE INVENTION

The present invention relates to micromachined inertial sensors, and more particularly to inertial sensors with reduced sensitivity to quadrature errors and micromachining inaccuracies such as sidewall angle asymmetry of the flexures used to support resonator shuttles.

BACKGROUND OF THE INVENTION

Micromachined (MEMS) gyroscopes have become established as useful commercial items. Generally speaking, a MEMS gyroscope incorporates two high-performing MEMS devices, specifically a self-tuned resonator in the drive axis and a micro-acceleration sensor in the sensing axis. Gyroscope performance is very sensitive to such things as manufacturing variations, errors in packaging, driving, linear acceleration, and temperature, among other things. Basic principles of operation of angular-rate sensing gyroscopes are well understood and described in the prior art (e.g., Geen, J. et al., *New iMEMS Angular-Rate-Sensing Gyroscope*, Analog Devices, Inc., Analog Dialog 37-03 (2003), available at http://www.analog.com/library/analogDialogue/archives/37-03/gyro.html, which is hereby incorporated herein by reference in its entirety).

The principles of vibratory sensing angular rate gyroscopes with discrete masses are long-established (see, for example, Lyman, U.S. Pat. No. 2,309,853 and Lyman, U.S. Pat. No. 2,513,340, each of which is hereby incorporated herein by reference in its entirety). Generally speaking, a vibratory rate gyroscope works by oscillating a proof mass (also referred to herein as a "shuttle" or "resonator"). The oscillation is generated with a periodic force applied to a spring-mass-damper system at the resonant frequency. Operating at resonance allows the oscillation amplitude to be large relative to the force applied. When the gyroscope is rotated, Coriolis acceleration is generated on the oscillating proof mass in a direction orthogonal to both the driven oscillation and the rotation. The magnitude of Coriolis acceleration is proportional to both the velocity of the oscillating proof mass and the rotation rate. The resulting Coriolis acceleration can be measured by sensing the deflections of the proof mass. The electrical and mechanical structures used to sense such deflections of the proof mass are referred to generally as the accelerometer.

One of the more troubling manufacturing errors for micromachined gyroscopes is asymmetry of the sidewall angle produced during etching of the flexures. This tends to cross-couple the in-plane (X-Y axes) and out of plane (Z axis) motions. For example, in X-Y gyroscopes of the type described in U.S. Pat. Nos. 5,635,640, 5,869,760, 6,837,107, 6,505,511, 6,122,961, and 6,877,374, each of which is hereby incorporated herein by reference in its entirety, such asymmetry can result in a so-called "quadrature" interfering signal, a motion of the Coriolis accelerometer in phase with the resonator displacement. This cross coupling is nominally about 1% in typical production processes. Extraordinary production measures can reduce it to 0.1% but in processes optimized for high etching speed (and therefore low-cost) it can be as high as 5%. In contrast, the full scale signal of a low-cost consumer-grade gyro is typically only 0.001% and the required resolution might be 1,000 times to 10,000 times smaller than full scale. Thus, the interfering signal is comparatively large and places an almost impossible dynamic range requirement on the gyro electronics. The quadrature signal can be nulled with static trimming and a servo using appropriate electrodes, as described in other disclosures. However, the stability requirements of the trim and dynamic range of the servo are still very difficult electronics constraints with the tolerances accompanying high-speed mass production.

A symmetric structure with angular vibration in-plane (i.e. about the Z axis) produces Coriolis induced out-of-plane tilts (i.e., about X-Y axes). Generally speaking, the out-of-plane tilt produced by a flexure with bad sidewalls is about an axis perpendicular to the long dimension of the flexure.

SUMMARY OF THE INVENTION

In accordance with one aspect of the invention there is provided a MEMS gyroscope comprising a first resonator configured for sensing rotation about a first axis (e.g., x axis) in a device plane, the first resonator including a first pair of shuttles suspended by a first plurality of suspension flexures and interconnected by a first fork, the first plurality of suspension flexures configured to allow the first pair of shuttles to be rotationally dithered in the device plane and to tilt out-of-plane about respective tilt axes (e.g., axes y1 and y2) perpendicular to the first axis; a second resonator configured for sensing rotation about a second axis (e.g., y axis) normal to the first axis in the device plane, the second resonator including a second pair of shuttles suspended by a second plurality of suspension flexures and interconnected by a second fork, the second plurality of suspension flexures configured to allow the second pair of shuttles to be rotationally dithered in the device plane and to tilt out-of-plane about a tilt axis perpendicular to the second axis (e.g., axis x2); a first set of Coriolis sensing electrodes underlying the first pair of shuttles and positioned along an axis (e.g., axis x1) parallel to the first axis to sense tilting of the first pair of shuttles about their respective tilt axes (e.g., axes y1 and y2); and a second set of Coriolis sensing electrodes underlying the second pair of shuttles and positioned along the first resonator tilt axes (e.g., axes y1 and y2) to sense tilting of the second pair of shuttles about their tilt axis (e.g., axis x2).

In various alternative embodiments, the first and second resonators may operate in-phase with one another or may operate in anti-phase with one another. The suspension flexures may include at least one elongated member and at least one shorter member, and each shuttle's suspension flexures may be arranged such that the elongated members are parallel to the shuttle's tilt axis. Each shuttle may be suspended within its outer periphery, e.g., by two suspension flexures and a central anchor. Alternatively, each shuttle may be suspended outside of its outer periphery, e.g., by four suspension flexures. The first and second forks may be substantially the same or may be configured differently (e.g., the first fork may be a closed-loop fork and the second fork may be a split fork). The first and second resonators may be mechanically coupled (e.g., via the forks or via the adjacent shuttles) by one or more couplings so that the resonators operate in a phase-locked manner. For example, the resonators may operate in-phase with one another, and the coupling may be an in-phase coupling such as an elongated bar that is non-compliant to bending in the device plane in order to couple translations along its length and compliant to bending out-of-plane so that tilt motions of each resonator do not effectively couple into the other (e.g., the ratio of the torsional stiffness of the suspension flexures about the tilt axes to the angular stiffness of the bar coupling and forks is between around 100 to 1000). Alternatively, the resonators may operate in anti-phase with one another, and the coupling may be an anti-phase coupling. The gyroscope may also include a plurality of drivers configured for rotationally dithering the shuttles, a plurality of velocity sensing electrodes configured for sensing rotationally dithered motion of the shuttles, a plurality of in-phase adjusting electrodes underlying the shuttles, and/or a plurality of quadrature adjusting electrodes underlying the shuttles.

In accordance with another aspect of the invention there is provided a MEMS gyroscope comprising a resonator shuttle configured for sensing rotation about an axis of sensitivity in a device plane and a set of suspension flexures configured to allow the shuttle to be rotationally dithered in the device plane and to tilt out-of-plane about a tilt axis perpendicular to the axis of sensitivity, wherein the suspension flexures include at least one elongated member and at least one shorter member, and wherein the suspension flexures are arranged such that the elongated members are parallel to the tilt axis.

The gyroscope may also include a set of Coriolis sensing electrodes underlying the shuttle and positioned along an axis perpendicular to the tilt axis to sense tilting of the shuttle about the tilt axis.

In accordance with another aspect of the invention there is provided a MEMS gyroscope comprising a first resonator configured for resonating in a device plane and sensing rotation about a first axis in the device plane; a second resonator configured for resonating in the device plane and sensing rotation about a second axis orthogonal to the first axis in the device plane; and at least one coupling interconnecting the first and second resonators, the at least one coupling configured to lock the resonance of the first and second resonators and to substantially prevent transfer of out-of-plane movements of each resonator to the other resonator.

Each resonator may include two shuttles interconnected by a fork, and the at least one coupling may interconnect the forks. Alternatively, each resonator may include two shuttles interconnected by a fork, and the at least one coupling may includes a first coupling connecting a first shuttle of the first resonator and a first shuttle of the second resonator and a second coupling connecting a second shuttle of the first resonator and a second shuttle of the second resonator. The resonators may operate in-phase with one another, and the coupling may be an in-phase coupling such as an elongated bar that is non-compliant to bending in the device plane in order to couple translations along its length and compliant to bending out-of-plane so that tilt motions of each resonator do not effectively couple into the other (e.g., the ratio of the torsional stiffness of the suspension flexures about the tilt axes to the angular stiffness of the bar coupling and forks is between around 100 to 1000). Alternatively, the resonators may operate in anti-phase with one another, and the coupling may be an anti-phase coupling.

BRIEF DESCRIPTION OF THE DRAWINGS

The foregoing and advantages of the invention will be appreciated more fully from the following further description thereof with reference to the accompanying drawings wherein:

FIG. 6A shows the anti-phase coupling in detail and FIG. 6B shows the anti-phase coupling connected to the gyroscope forks;

FIG. 7A shows the anti-phase coupling in detail and FIG. 7B shows the anti-phase coupling connected to the gyroscope forks.

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

Definitions. As used in this description and the accompanying claims, the following terms shall have the meanings indicated, unless the context otherwise requires:

A "set" includes one or more members.

In exemplary embodiments of the present invention, an X-Y axis gyroscope incorporates two specially-configured single-axis gyroscopes to sense rotations about two orthogonal axes (the axes of sensitivity) in the device plane. Each single-axis gyroscope includes a resonator having two rotationally-dithered shuttles interconnected by a coupling (referred to hereinafter for convenience as a "fork"), where each shuttle is configured to tilt out-of-plane along a tilt axis perpendicular to the axis of sensitivity and includes corresponding Coriolis sensing electrodes positioned along an axis perpendicular to the tilt axis (i.e., parallel to the axis of sensitivity). Among other things, such a configuration tends to reduce sensitivity of each single-axis gyroscope to out-of-plane movements of the shuttles along the tilt axis.

Furthermore, in certain embodiments, the suspension flexures supporting each shuttle are configured in such a way that that manufacturing errors, particularly sidewall angle asymmetry, are substantially rejected. Thus, rather than trying to improve sidewall angle quality, the configuration of the gyroscope reduces the effect of such manufacturing errors on gyroscope performance. As a result, it may become more economically feasible to use MEMS-only processes, which generally have inferior micromachining accuracy compared to other micromachining processes and therefore are generally not considered gyroscope-capable processes, to produce low-cost gyroscopes with greater production capacity and yield.

In certain embodiments, the motor motions of the two single-axis gyroscopes may be coupled to produce a single resonance frequency. As described in greater detail below, the two single-axis gyroscopes may be interconnected by one or more couplings so as to operate either in-phase with one another or in anti-phase with one another. For convenience, a coupling used for in-phase operation may be referred to hereinafter as an "in-phase coupling" and a coupling used for anti-phase operation may be referred to hereinafter as an "anti-phase coupling." In certain embodiments, the two forks may be interconnected by a coupling, and in certain other embodiments, adjacent pairs of shuttles may be interconnected by a coupling. In any case, the couplings are typically configured to lock the motor motions of the gyroscopes without transferring out-of-plane (e.g., quadrature) motions from one to the other.

Figure 1:
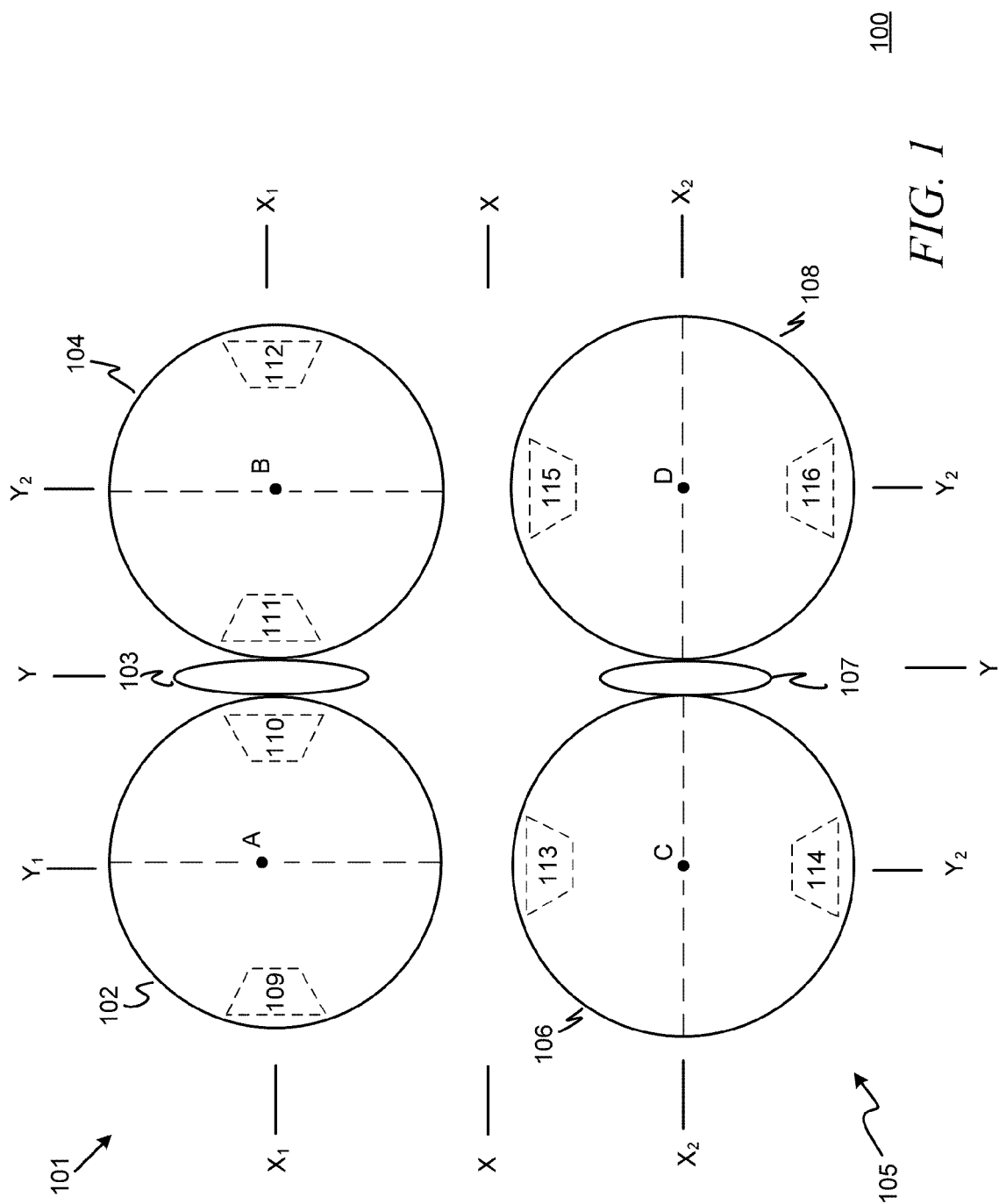
FIG. 1 is a schematic diagram showing an X-Y axis gyroscope in accordance with an exemplary embodiment of the present invention.

FIG. 1 is a schematic diagram of an X-Y axis gyroscope 100 in accordance with an exemplary embodiment of the present invention. This vibratory gyroscope operates under principles disclosed in Geen, U.S. Pat. No. 5,635,640, which is hereby incorporated herein by reference in its entirety. Specifically, this vibratory gyroscope includes various micromachined gyroscope structures in a device layer (plane) oriented above an underlying substrate having various substrate layer structures. For convenience, relevant gyroscope structures are described below with reference to axes labeled "x" and "y" in the device plane, which schematically represent the axes about which Coriolis acceleration is sensed (i.e., the gyroscope sensing axes), as well as to "z" axes normal to the x-y plane.

As shown in FIG. 1, this exemplary gyroscope 100 includes two resonators, each including two rotationally-dithered masses (referred to hereinafter as shuttles) interconnected by a coupling (referred to hereinafter as a fork) that, among other things, ensures that the shuttles resonate substantially in anti-phase with one another within the device plane. Specifically, the resonator 101 includes shuttles 102 and 104 interconnected by fork 103, and the resonator 105 includes shuttles 106 and 108 interconnected by fork 107. The shuttles 102 and 104 are centered along an axis x1 parallel to the x axis, and the shuttles 106 and 108 are centered along an axis x2 parallel to the x axis. The shuttles 102 and 106 are centered along an axis y1 parallel to the y axis, and the shuttles 104 and 108 are centered along an axis y2 parallel to the y axis. The shuttles 102 and 104 are rotationally-dithered about the z-oriented axes labeled A and B, respectively, and the shuttles 106 and 108 are rotationally-dithered about the z-oriented axes labeled C and D, respectively. Generally speaking, such interconnected pairs of shuttles obviates the need for costly mounting isolation because, among other things, motor vibration momenta tends to be cancelled locally so as to desensitize the resonators to mounting losses and an antisymmetry of the accelerometers tends to desensitize them to such things as external acceleration, external vibration at the motor frequency, and die-stresses. As discussed in more detail below, when the shuttles are resonating, out-of-plane movements of the shuttles, caused predominantly by Coriolis forces as the gyroscope is rotated about the x and/or y axes, are sensed by various Coriolis sensing electrodes arranged on the underlying substrate.

Furthermore, in the exemplary gyroscope 100, one resonator is configured to sense rotation about the x-axis only and the other resonator is configured to sense rotation about the y-axis only. Specifically, the resonator 101 is configured to sense rotation about the x-axis only, with shuttles 102 and 104 suspended so as to tip only along axes y1 and y2 respectively (represented by the vertical dashed lines depicted within shuttles 102 and 104 along the y1 and y2 axes respectively), and with Coriolis sensing electrodes (109,110) and (111,112) placed under the shuttles 102 and 104 substantially along the perpendicular axis x1. The Coriolis sensing electrodes 109 and 112 operate substantially in phase with one another while the Coriolis sensing electrodes 110 and 111 operate substantially in phase with one another but in anti-phase with Coriolis sensing electrodes 109 and 112 (i.e., when the shuttles 102 and 104 tilt toward Coriolis sensing electrodes 109 and 112, they tilt away from Coriolis sensing electrodes 110 and 111, and vice versa). Similarly, the resonator 105 is configured to sense rotation about the y-axis only, with shuttles 106 and 108 suspended so as to tip only along the axis x2 (represented by the horizontal dashed lines depicted within shuttles 106 and 108 along the x2 axis), and with Coriolis sensing electrodes (113,114) and (115,116) placed under the shuttles 106 and 108 substantially along the perpendicular y1 and y2 axes respectively. The Coriolis sensing electrodes 113 and 116 operate substantially in phase with one another while the Coriolis sensing electrodes 114 and 115 operate substantially in phase with one another but in anti-phase with Coriolis sensing electrodes 113 and 116 (i.e., when the shuttles 106 and 108 tilt toward Coriolis sensing electrodes 113 and 116, they tilt away from Coriolis sensing electrodes 114 and 115, and vice versa). As discussed in more detail below, such placement of the Coriolis sensing electrodes makes them sensitive to tilt about the shuttle's tilt axis but not to tilt about the axis perpendicular to the shuttle's tilt axis.

The gyroscope 100 typically includes various other types of structures (not shown in FIG. 1 for the sake of simplicity) such as drive electrodes for driving resonance of the shuttles, velocity sensing electrodes for sensing shuttle resonance, and quadrature and in-phase compensation electrodes for providing compensatory signals for various types of error sources. In typical embodiments, these electrodes are electrostatically coupled with corresponding resonator structures, although other types of structures may be used in various alternative embodiments (e.g., piezoelectric drivers/sensors). These types of structures, as well as related circuitry, are known in the art.

In a typical embodiment, the two resonators are operated in phase with one another such that the shuttles 102 and 106 resonate in phase with one another and the shuttles 104 and 108 resonate in phase with one another but in anti-phase with the shuttles 102 and 106. Thus, when shuttles 102 and 106 are moving in a clockwise direction, the shuttles 104 and 108 are moving in a counterclockwise direction, and vice versa. In this mode, the forks 103 and 107 move in phase with one another along the y axis.

It is desirable to have all of the resonator shuttles operate in a phase-locked manner. Among other things, phase-locked operation generally simplifies the drive electronics, thereby saving cost and complexity. It also tends to avoid interference problems from relative drift of clock edges and beat frequencies. Also, when high Q resonators are used, it allows for Q to be more fully exploited.

Therefore, in certain embodiments of the present invention, the forks 103 and 107 are interconnected by a simple in-phase coupling (referred to hereinafter as a bar) that effectively locks the in-phase motor resonances of the resonators 101 and 105 together while rejecting the transfer of quadrature motion from one to the other. This bar is stiff along its length, tightly coupling the fork translations in the direction of that length and thereby locking the motor motions together. However, being relatively long and thin, it is compliant to bending out-of-plane so that the tilt motion of one pair does not effectively couple into the other. The attenuation of quadrature is roughly the ratio of the torsional stiffness of the Coriolis accelerometer to the angular stiffness of the bar coupling and forks. In exemplary embodiments, the ratio may be between around 100 and 1000 without compromising other design constraints. Thus, the effective quadrature can be reduced, e.g., to the order of 10 times the Coriolis full scale, which can then be accommodated with much simpler electronics.

Figure 2:
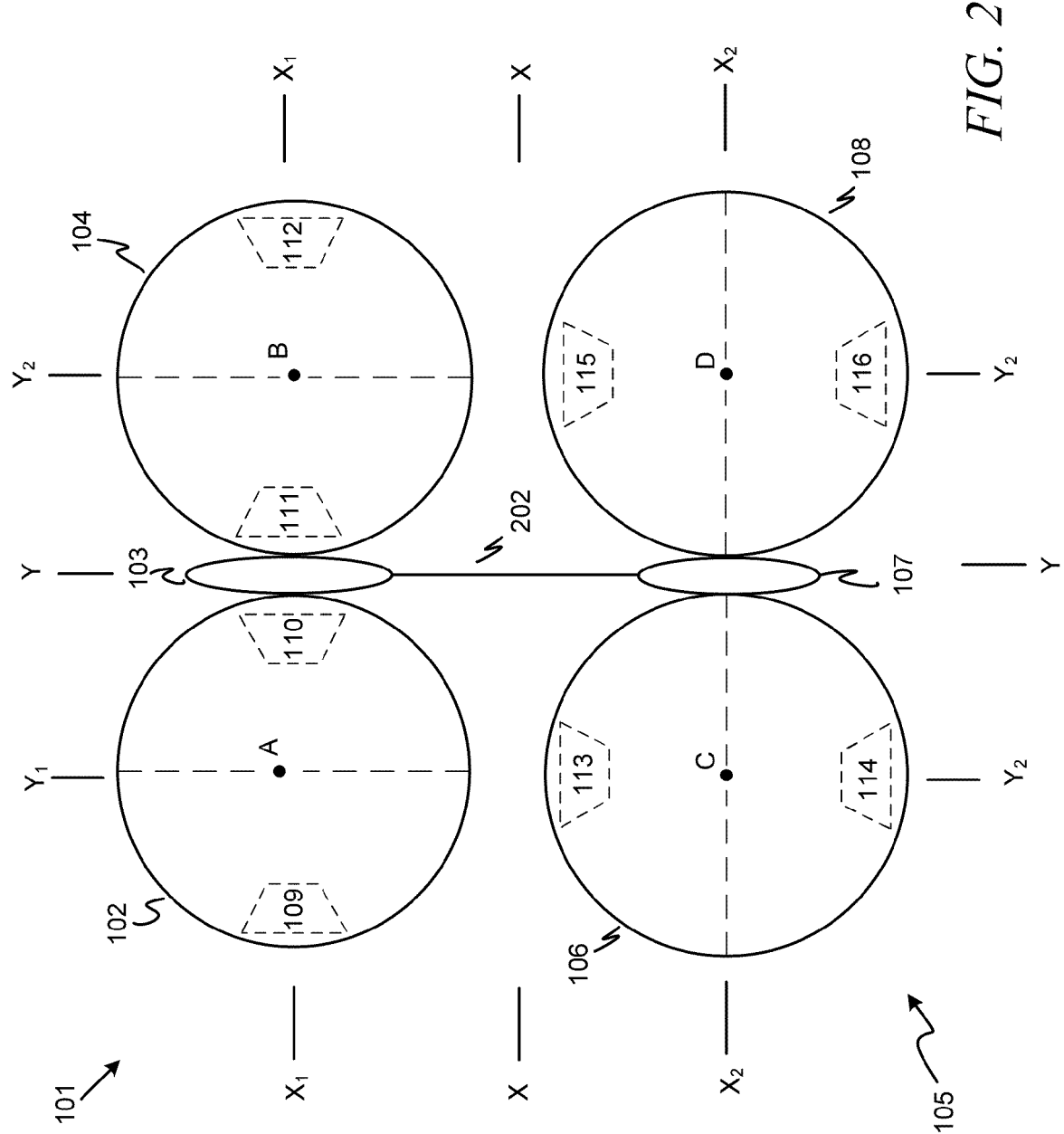
FIG. 2 is a schematic diagram showing the gyroscope of FIG. 1 with the forks 103 and 107 interconnected by a bar, in accordance with an exemplary embodiment of the present invention.

FIG. 2 is a schematic diagram showing the gyroscope of FIG. 1 with the forks 103 and 107 interconnected by a bar 202, in accordance with an exemplary embodiment of the present invention. In the steady state, the bar 202 mechanically couples resonators 101 and 105 so that they operate in-phase substantially at a single resonance frequency. However, when the shuttles of resonator 101 and/or resonator 105 tilt out-of-plane due to Coriolis forces or otherwise, the bar 202 bends out-of-plane so as to substantially prevent the tilt motion of one resonator from coupling into the other resonator.

As discussed above, the out-of-plane tilt produced by a flexure with bad sidewalls is generally about an axis perpendicular to the long dimension of the flexure. In order to prevent such manufacturing errors from corrupting the Coriolis signal, in certain embodiments of the present invention, shuttle flexures associated with each shuttle are configured with the long dimensions of the flexures parallel to the shuttle's tilt axis, such that resulting out-of-plane tilt generally would be about the axis perpendicular to the shuttle's tilt axis. Since the Coriolis sensing electrodes associated with each shuttle are positioned such that they are substantially insensitive to tilt about the axis perpendicular to the tilt axis, this shuttle flexure configuration tends to reject motion induced by sidewall angle asymmetry of the flexures (i.e., about an axis perpendicular to the long dimension of the flexure, which is also perpendicular to the tilt axis), and thereby tends to ease electronics constraints, reduce cost, and improve gyroscope performance.

Thus, rather than trying to fix the problem of bad flexure sidewalls by, say, improving the quality of the flexure sidewalls (e.g., through the use of different materials, different types of etching, and/or additional fabrication processes), embodiments of the present invention essentially immunize the gyroscope from such manufacturing errors through a mechanical design that reduces the sensitivity of the gyroscope to such manufacturing errors.

Figure 3:
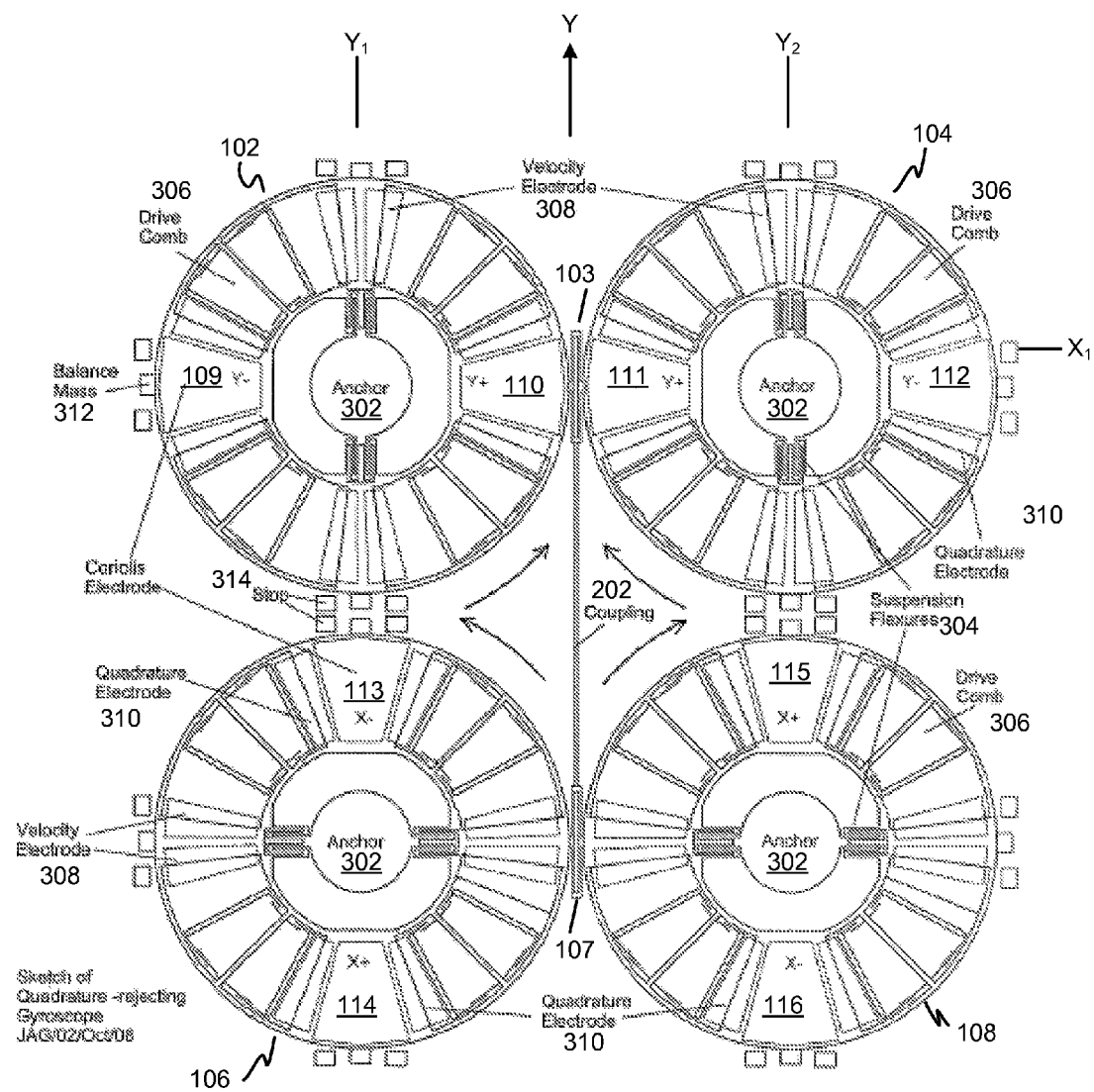
FIG. 3 is a schematic diagram showing an exemplary gyroscope of the type shown in FIG. 2 and having a first arrangement of flexures, in accordance with an exemplary embodiment of the present invention.

FIG. 3 is a schematic diagram showing an exemplary gyroscope of the type shown in FIG. 2 and having a first arrangement of flexures, in accordance with an exemplary embodiment of the present invention. Here, each shuttle is supported by a central anchor 302 and a pair of flexures 304 positioned along the shuttle tilt axis. As discussed above, the long dimensions of the flexures 304 for each shuttle are parallel to the shuttle's tilt axis. Specifically, long dimensions of the shuttle flexures 304 associated with shuttles 102 and 104 are parallel to the y-axis while the long dimensions of the shuttle flexures 304 associated with shuttles 106 and 108 are parallel to the x-axis. The gyroscope also includes various other types of structures such as four sets of drive electrodes 306 for each shuttle, two sets of velocity sensing electrodes 308 for each shuttle, four sets of quadrature compensation electrodes 310 for each shuttle (where each set includes a pair of electrodes positioned on opposite sides of a Coriolis sensing electrode), three balance masses 312 on each shuttle, and three sets of stops 314 for each shuttle to prevent damage from over-rotation of the shuttles. For the sake of simplicity, not all of the various structures are labeled in the figure.

Figure 4:
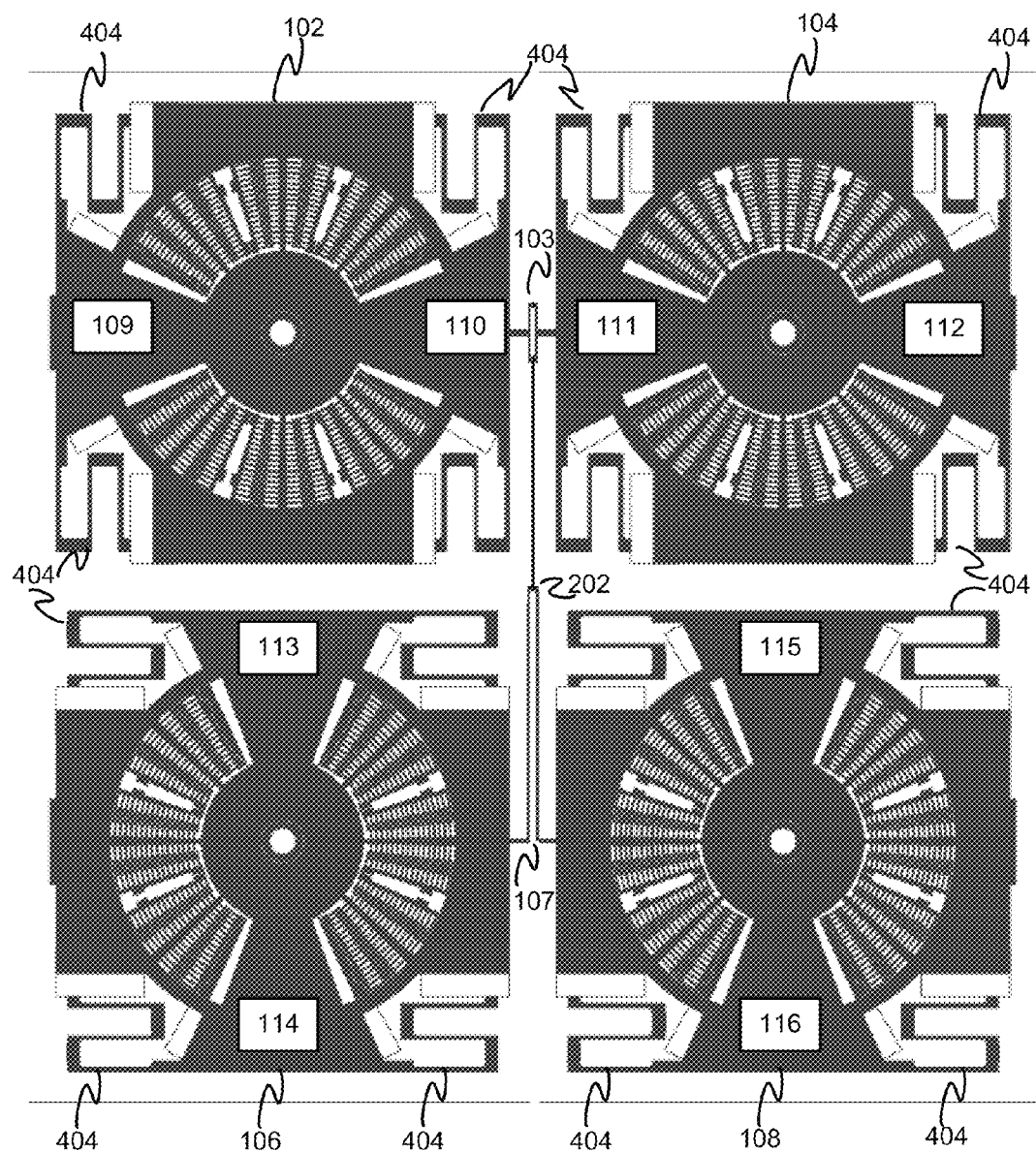
FIG. 4 is a schematic diagram showing an exemplary gyroscope of the type shown in FIG. 2 and having a second arrangement of flexures, in accordance with an exemplary embodiment of the present invention.

FIG. 4 is a schematic diagram showing an exemplary gyroscope of the type shown in FIG. 2 and having a second arrangement of flexures, in accordance with an exemplary embodiment of the present invention. Here, each shuttle is supported by four outer flexures 404. As discussed above, the long dimensions of the shuttle flexures 404 for each shuttle are parallel to the shuttle's tilt axis. Specifically, long dimensions of the shuttle flexures 404 associated with shuttles 102 and 104 are parallel to the y-axis while the long dimensions of the shuttle flexures 404 associated with shuttles 106 and 108 are parallel to the x-axis. In this exemplary embodiment, forks 103 and 107 are configured differently in order to accommodate the different types of movements of the resonators 101 and 105. Specifically, fork 103 is shown as having a closed-loop configuration whereas fork 107 is shown as having a split configuration. The closed-loop configuration of fork 103 can accommodate both the in-plane anti-phase movements of shuttles 102 and 104 as they resonate and the out-of-plane (i.e., up and down) movements of fork 103 as shuttles 102 and 104 tilt along the y1 and y2 axes. Such a closed-loop configuration would tend to hinder operation of shuttles 106 and 108, which essentially tilt in opposite directions about the x2 axis in a twisting motion. The split configuration of fork 107 accommodates this twisting motion while also being longitudinally stiff in-plane.

Figure 5:
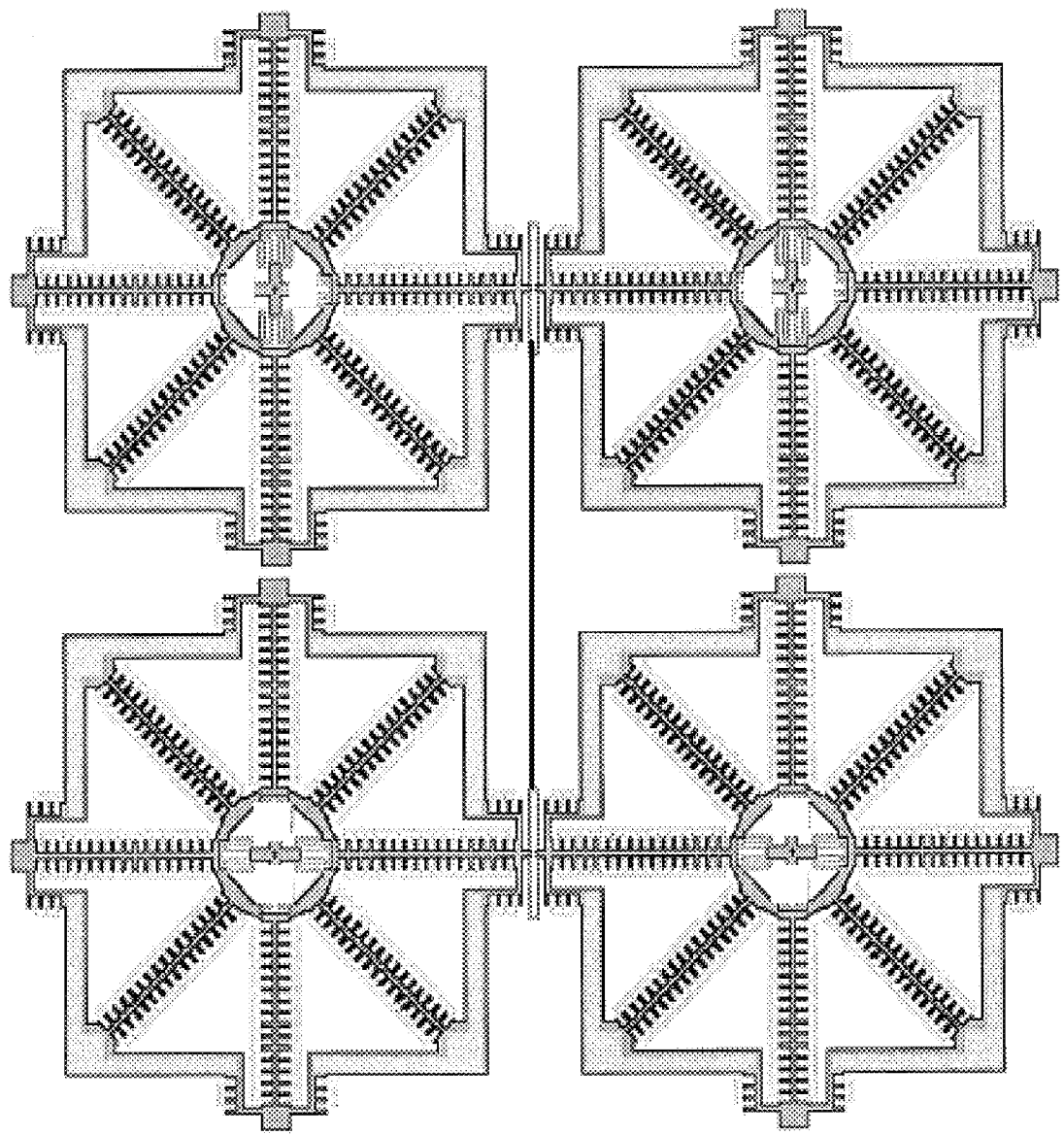
FIG. 5 is a schematic diagram showing an alternative embodiment in which the shuttles are substantially square, in accordance with an exemplary embodiment of the present invention.

It should be noted that the rotationally-dithered shuttles 102, 104, 106, 108 do not necessarily have to be round. FIG. 5 is a schematic diagram showing an alternative embodiment in which the shuttles are substantially square. This gyroscope configuration would operate generally as the one described above with reference to FIGS. 2 and 3, but in some respects might facilitate micromachining because micromachining equipment (e.g., etching equipment) often produce etches based upon a rectilinear grid and so structures that are aligned with the grid or at 45 degree angles thereto generally may be produced more consistently and with straighter edges. In a typical embodiment, some of the radially-oriented comb structures would be used as drive electrodes while others would be used for velocity sensing. This embodiment is shown with the two forks interconnected by a bar for coupling in-phase operation of the two resonators, although it should be noted that the bar may be omitted from certain embodiments as described above with reference to FIG. 1.

In the embodiments described above, the resonators 101 and 105 of FIG. 1 are operated in-phase with one another. In certain alternative embodiments, the resonators 101 and 105 of the gyroscope shown in FIG. 1 may be operated in anti-phase with one another in a manner similar to a "cross-quad" configuration (U.S. Pat. No. 7,421,897, which is hereby incorporated herein by reference in its entirety, describes an exemplary "cross-quad" gyroscope having linearly-dithered masses suspended within outer frames that are mechanically coupled by various horizontal and vertical couplings), such that the shuttles 102 and 108 resonate in phase with one another and the shuttles 104 and 106 resonate in phase with one another and in anti-phase with the shuttles 102 and 108. Thus, when shuttles 102 and 108 are moving in a clockwise direction, the shuttles 104 and 106 are moving in a counter-clockwise direction, and vice versa. In this mode, the forks 103 and 107 move in anti-phase with one another.

In order to phase-lock the resonators for such anti-phase operation, the forks 103 and 107 may be mechanically coupled to obtain a single resonance frequency, although the coupling generally would not be a simple bar as depicted in FIG. 2 because a bar would tend to oppose the anti-phase movements of the forks and hence would tend to prevent the resonators from resonating. Instead, an anti-phase coupling that enables anti-phase movements but prevents in-phase movements of the forks along the y-axis could be used to couple the forks. Such an anti-phase coupling generally would be more complex than a simple bar.

Figure 6A:
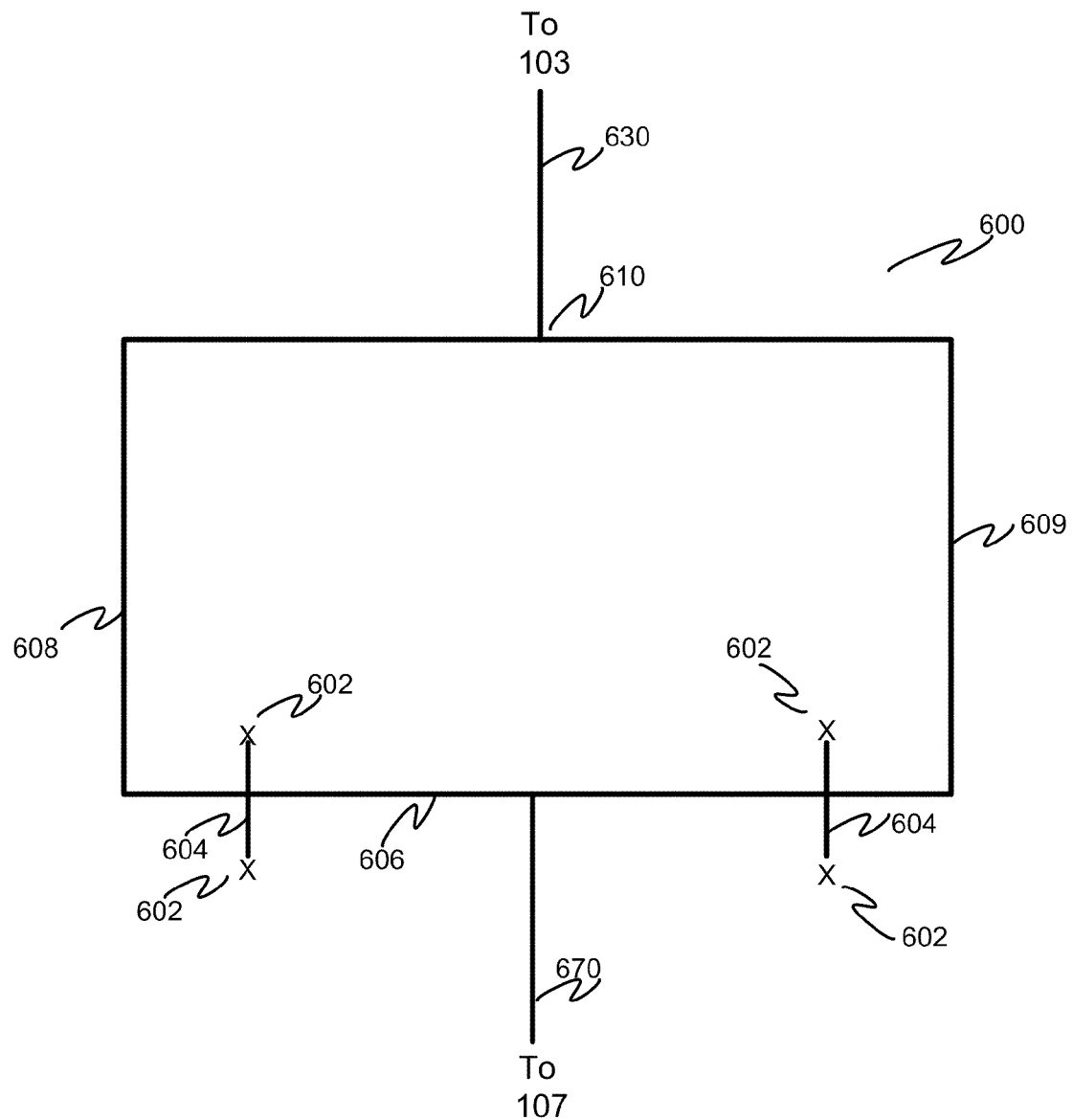
FIGS. 6A and 6B are schematic diagrams showing an anti-phase coupling in accordance with one exemplary embodiment of the present invention, where
Figure 6B:
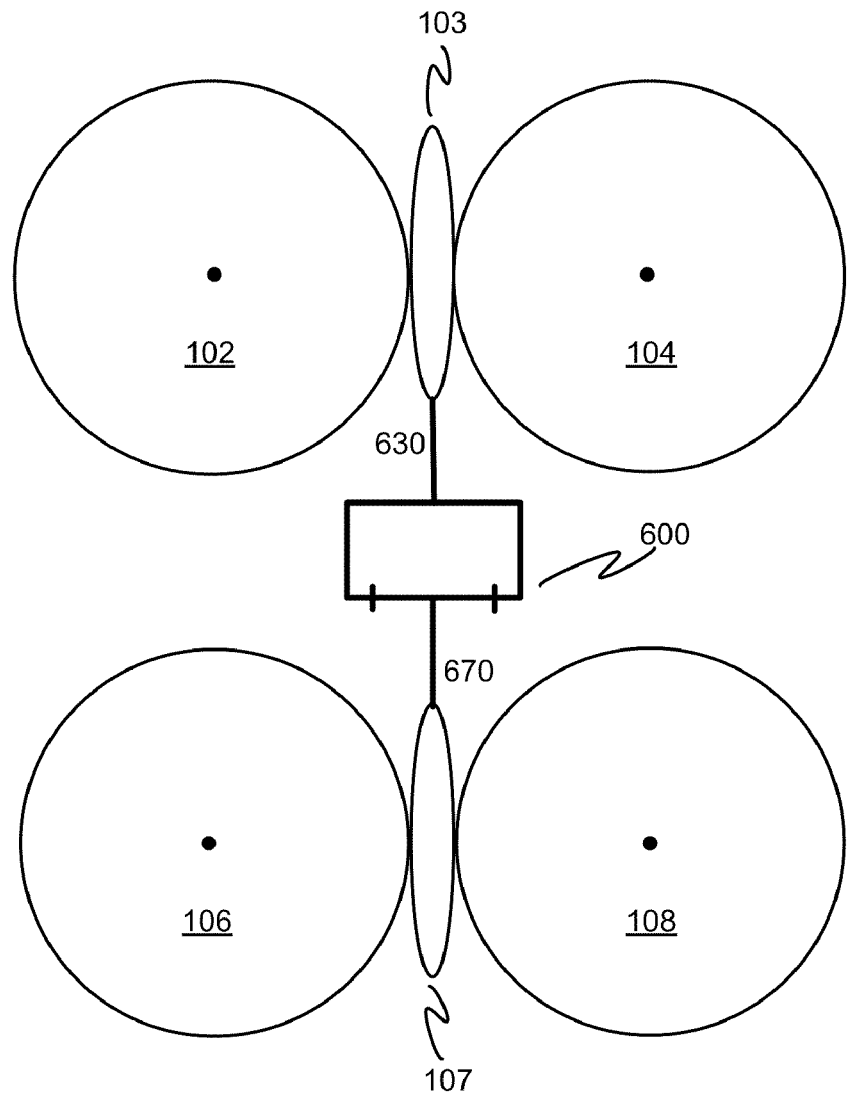

FIGS. 6A and 6B are schematic diagrams showing an anti-phase coupling 600 in accordance with one exemplary embodiment of the present invention. As shown in FIG. 6A, this anti-phase coupling 600 includes a box-like structure with four side flexures 606, 608, 609, and 610. Flexure 606 is coupled substantially at its midpoint by bar 670 to the fork 107, while flexure 610 is coupled substantially at its midpoint by bar 630 to the fork 103. Flexure 606 is supported by two dumbbell-shaped support structures 604, each having two anchored flexures 602. The points at which the anchored flexures 604 meet the flexure 606 act as pivot points such that, when bar 670 is pulled downward, the flexures 608, 609, and 610 tend to move upward, and vice versa. FIG. 6B schematically shows the anti-phase coupling 600 connected to the gyroscope forks 103 and 107.

Figure 7A:
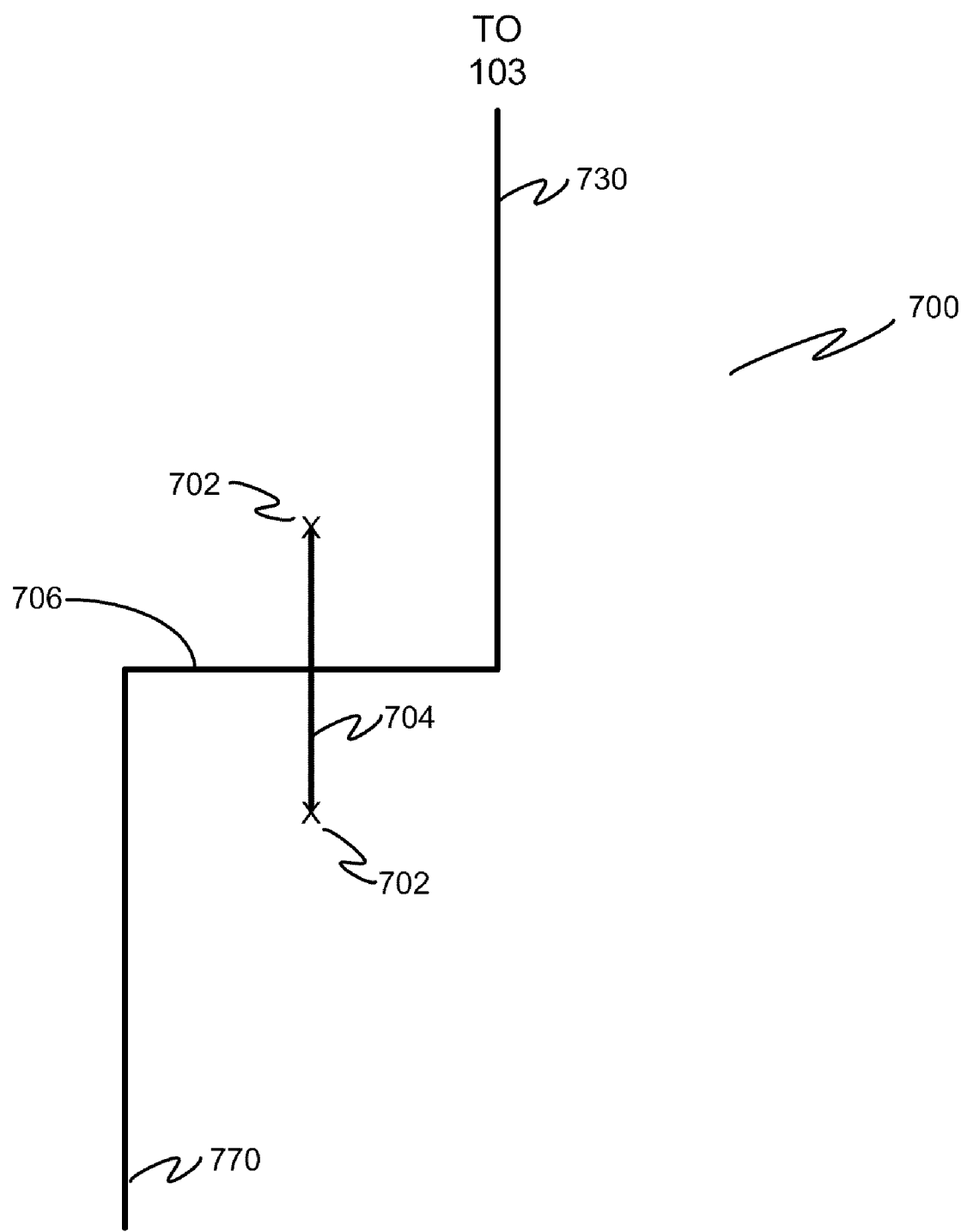
FIGS. 7A and 7B are schematic diagrams showing an anti-phase coupling in accordance with another exemplary embodiment of the present invention, where
Figure 7B:
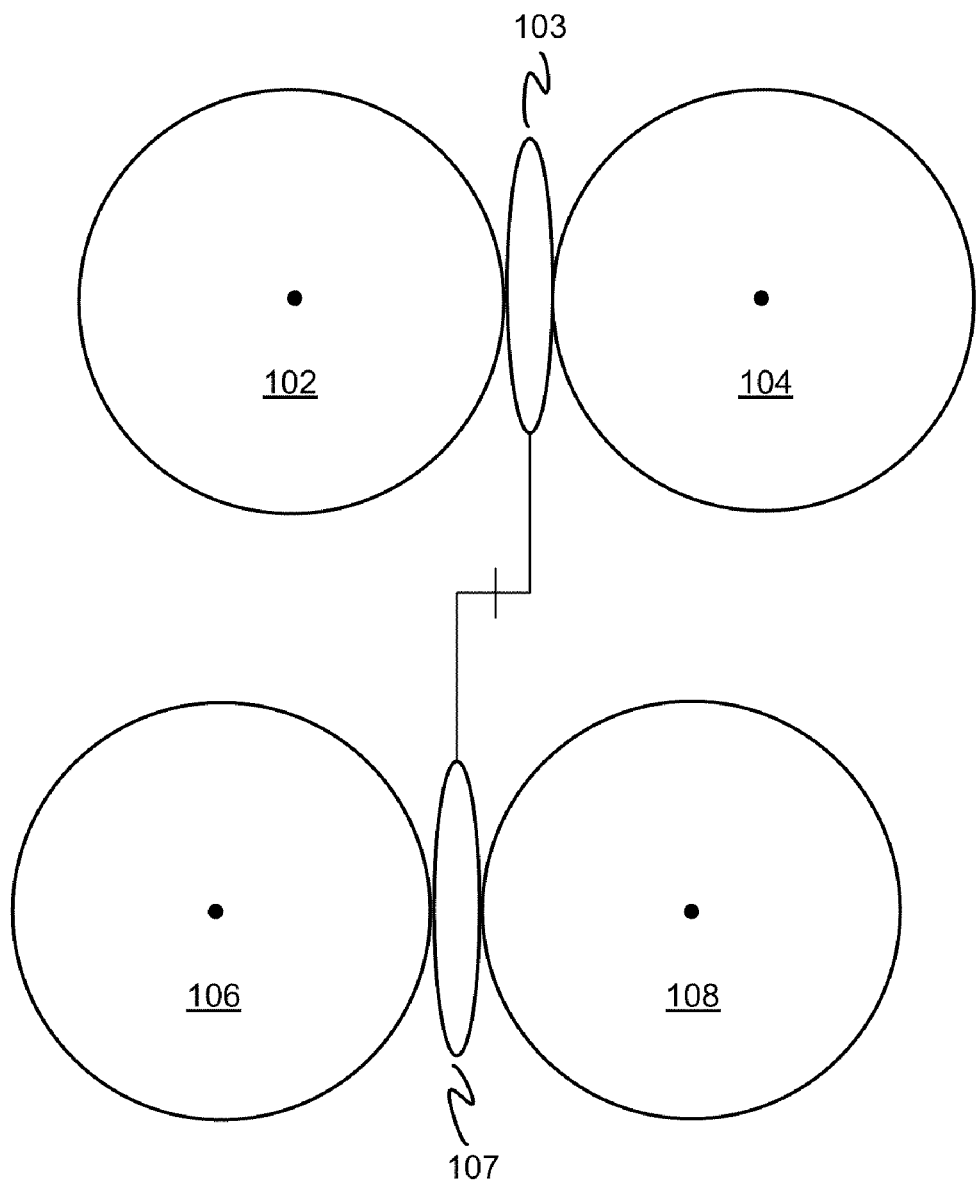

FIGS. 7A and 7B are schematic diagrams showing an anti-phase coupling 700 in accordance with another exemplary embodiment of the present invention. As shown in FIG. 7A, this anti-phase coupling 700 includes a seesaw-like structure with a flexure 706 supported substantially at its midpoint by a dumbbell-shaped support structure 704 having two anchored flexures 702. The point at which the anchored structures 704 meet the flexure 706 acts as a pivot point such that, when bar 770 is pulled downward, bar 730 tends to move upward, and vice versa. FIG. 7B schematically shows the anti-phase coupling 700 connected to the gyroscope forks 103 and 107. In this exemplary embodiment, the shuttles 106 and 108 are offset from the axes y1 and y2 to accommodate the geometry of the anti-phase coupling 700.

Another exemplary anti-phase coupling is described in U.S. Pat. No. 7,421,897, which is hereby incorporated herein by reference in its entirety. This anti-phase coupling includes a first pair of interconnected levers that would connect to one of the forks, the first pair of levers including a first lever and a second lever; a second pair of interconnected levers that would connect to the other fork, the second pair of levers including a third lever and a fourth lever; a plurality of lever support structures allowing the levers to pivot as the forks move in anti-phase to one another; a first coupling flexure interconnecting the first lever and the third lever substantially between their respective pivot points; and a second coupling flexure interconnecting the second lever and the fourth lever substantially between their respective pivot points. The coupling flexures substantially prevent in-phase movements of the frames. Both ends of each coupling flexure typically move transversely to the movements of the forks in the same direction by substantially the same amount during anti-phase movements of the forks but are urged to move in opposite directions during in-phase movements of the forks.

It should be noted that anti-phase couplings of the types described above tend to provide additional quadrature isolation between the two forks, primarily due to the anchored support structures through which the two bars are interconnected.

In certain embodiments, rather than interconnecting the forks 103 and 107 by a single in-phase or anti-phase coupling as discussed above, the two resonators may be interconnected by two in-phase or anti-phase couplings, one for each pair of adjacent shuttles.

Figure 8:
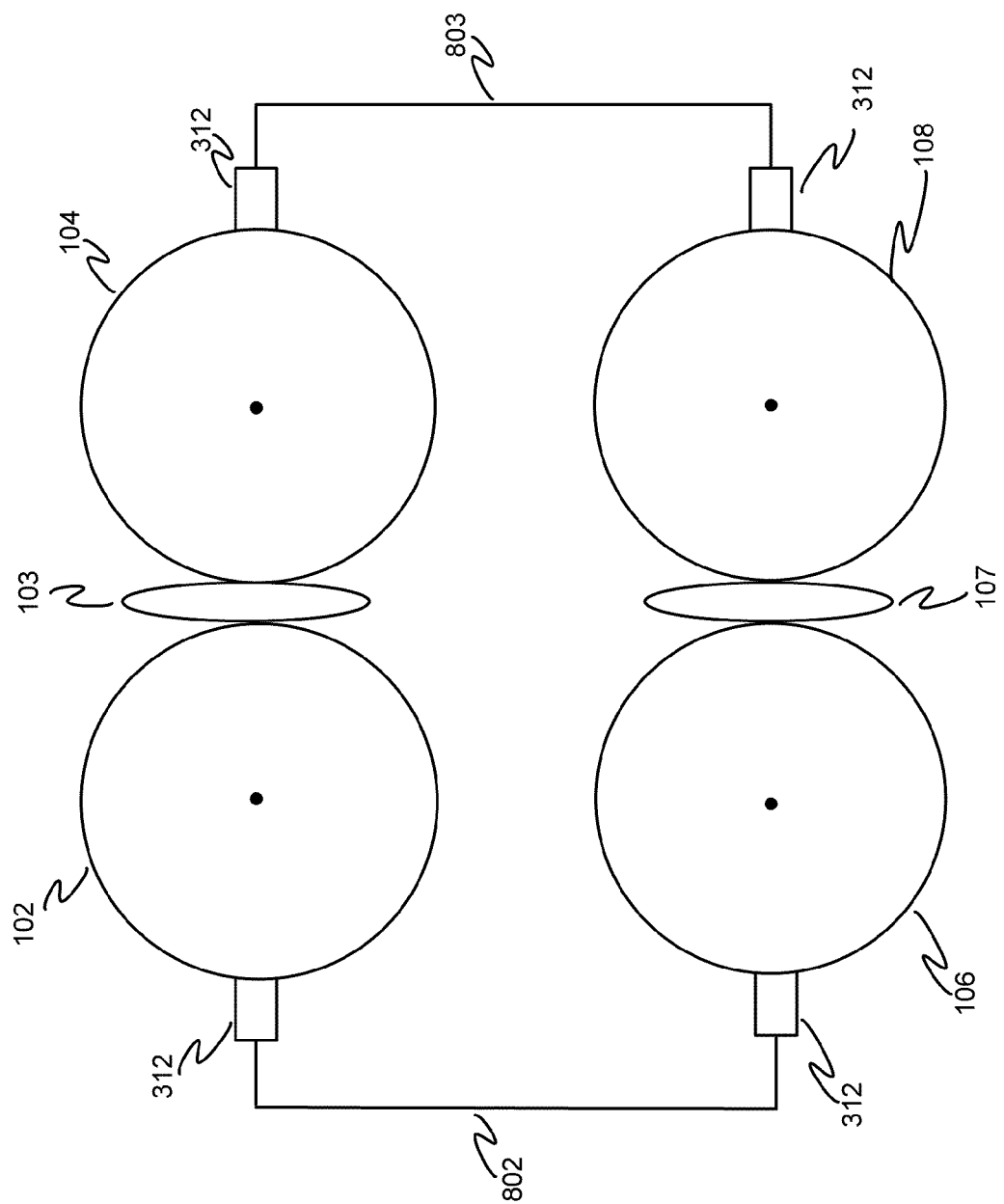
FIG. 8 is a schematic diagram showing a gyroscope with each pair of adjacent shuttles interconnected by a coupling, in accordance with an exemplary embodiment of the present invention.

FIG. 8 is a schematic diagram showing a gyroscope with each pair of adjacent shuttles interconnected by a coupling, in accordance with an exemplary embodiment of the present invention. Specifically, shuttles 102 and 106 are interconnected by coupling 802, and shuttles 104 and 108 are interconnected by coupling 803. Here, each coupling 802 and 803 connects to the balance masses 312 of its respective shuttles via two small flexures, although other types of connections may be made between the shuttles (e.g., couplings with or without such flexures may connect to the balance masses or directly to the outside of the shuttles). Among other things, the two short flexures help to isolate the out-of-plane motions of the shuttles and also position to the couplings to the outside of the stops 314 (shown in FIG. 3 but omitted from FIG. 8 for convenience). For in-phase operation of the resonators, the couplings 802 and 803 may be in-phase couplings similar to those described above, e.g., with reference to FIGS. 2-5, and for anti-phase operation of the resonators, the couplings 802 and 803 may be anti-phase couplings similar to those described above, e.g., with reference to FIGS. 6-7. It should be noted that alternative embodiments may include just one of couplings 802 and 803, which may be sufficient to couple the drive motions of the two resonators, although both couplings typically would be included for balance.

The present invention may be embodied in other specific forms without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A MEMS gyroscope comprising:
a first resonator configured for sensing rotation about a first axis x in a device plane, the first resonator including a first pair of shuttles suspended by a first plurality of suspension flexures and interconnected by a first fork, the first plurality of suspension flexures configured to allow the first pair of shuttles to be rotationally dithered in the device plane and to tilt out-of-plane about respective tilt axes y1 and y2 perpendicular to the first axis, each of the suspension flexures suspending the first pair of shuttles including at least one elongated member and at least one shorter member arranged such that the elongated member is parallel to the respective tilt axes;
a second resonator configured for sensing rotation about a second axis y normal to the first axis in the device plane, the second resonator including a second pair of shuttles suspended by a second plurality of suspension flexures and interconnected by a second fork, the second plurality of suspension flexures configured to allow the second pair of shuttles to be rotationally dithered in the device plane and to tilt out-of-plane about a tilt axis x2 perpendicular to the second axis, each of the suspension flexures suspending the second pair of shuttles including at least one elongated member and at least one shorter member arranged such that the elongated member is parallel to the tilt axis;
a first set of Coriolis sensing electrodes underlying the first pair of shuttles and positioned along an axis x1 parallel to the first axis to sense tilting of the first pair of shuttles about their respective tilt axes y1 and y2; and
a second set of Coriolis sensing electrodes underlying the second pair of shuttles and positioned along the first resonator tilt axes y1 and y2 to sense tilting of the second pair of shuttles about their tilt axis x2.

2. A MEMS gyroscope according to claim 1, wherein the first resonator and the second resonator operate in-phase with one another.

3. A MEMS gyroscope according to claim 1, wherein the first resonator and the second resonator operate in anti-phase with one another.

4. A MEMS gyroscope according to claim 1, wherein each shuttle is suspended within its outer periphery.

5. A MEMS gyroscope according to claim 4, wherein each shuttle is suspended by two suspension flexures and a central anchor.

6. A MEMS gyroscope according to claim 1, wherein each shuttle is suspended outside of its outer periphery.

7. A MEMS gyroscope according to claim 6, wherein each shuttle is suspended by four suspension flexures.

8. A MEMS gyroscope according to claim 1, wherein the first fork and the second fork are substantially the same.

9. A MEMS gyroscope according to claim 1, wherein the first fork and the second fork are configured differently.

10. A MEMS gyroscope according to claim 9, wherein the first fork is a closed-loop fork and wherein the second fork is a split fork.

11. A MEMS gyroscope according to claim 1, further comprising:
    at least one coupling interconnecting the first and second resonators so that the resonators operate in a phase-locked manner.

12. A MEMS gyroscope according to claim 11, wherein the resonators operate in-phase with one another, and wherein the at least one coupling is an in-phase coupling.

13. A MEMS gyroscope according to claim 12, wherein the in-phase coupling includes an elongated bar that is non-compliant to bending in the device plane in order to couple translations along its length and is compliant to bending out-of-plane so that tilt motions of each resonator do not effectively couple into the other.

14. A MEMS gyroscope according to claim 13, wherein the ratio of the torsional stiffness of the suspension flexures about the tilt axes to the angular stiffness of the bar coupling and forks is between around 100 to 1000.

15. A MEMS gyroscope according to claim 11, wherein the resonators operate in anti-phase with one another, and wherein the at least one coupling is an anti-phase coupling.

16. A MEMS gyroscope according to claim 11, wherein the at least one coupling includes a coupling connecting the first fork and the second fork.

17. A MEMS gyroscope according to claim 11, wherein the at least one coupling includes:
    a first coupling connecting a first shuttle of the first resonator and a first shuttle of the second resonator; and
    a second coupling connecting a second shuttle of the first resonator and a second shuttle of the second resonator.

18. A MEMS gyroscope according to claim 1, further comprising at least one of:
    a plurality of drivers configured for rotationally dithering the shuttles;
    a plurality of velocity sensing electrodes configured for sensing rotationally dithered motion of the shuttles
    a plurality of in-phase adjusting electrodes underlying the shuttles; and
    a plurality of quadrature adjusting electrodes underlying the shuttles.

19. A MEMS gyroscope comprising:
    a resonator shuttle configured for sensing rotation about an axis of sensitivity in a device plane; and
    a set of suspension flexures configured to allow the shuttle to be rotationally dithered in the device plane and to tilt out-of-plane about a tilt axis perpendicular to the axis of sensitivity, wherein each of the suspension flexures suspending the shuttle includes at least one elongated member and at least one shorter member arranged such that the elongated members are parallel to the tilt axis.

20. A MEMS gyroscope according to claim 19, further comprising:
    a set of Coriolis sensing electrodes underlying the shuttle and positioned along an axis perpendicular to the tilt axis to sense tilting of the shuttle about the tilt axis.

21. A MEMS gyroscope comprising:
    a first resonator configured for resonating in a device plane and sensing rotation about a first axis in the device plane;
    a second resonator configured for resonating in the device plane and sensing rotation about a second axis orthogonal to the first axis in the device plane; and
    at least one coupling interconnecting the first and second resonators, the at least one coupling configured to lock the resonance of the first and second resonators and to substantially prevent transfer of out-of-plane movements of each resonator to the other resonator.

22. A MEMS gyroscope according to claim 21, wherein each resonator includes two shuttles interconnected by a fork, and wherein the at least one coupling interconnects the forks.

23. A MEMS gyroscope according to claim 21, wherein each resonator includes two shuttles interconnected by a fork, and wherein the at least one coupling includes:
    a first coupling connecting a first shuttle of the first resonator and a first shuttle of the second resonator; and
    a second coupling connecting a second shuttle of the first resonator and a second shuttle of the second resonator.

24. A MEMS gyroscope according to claim 21, wherein the resonators operate in-phase with one another, and wherein the at least one coupling is an in-phase coupling.

25. A MEMS gyroscope according to claim 24, wherein the in-phase coupling includes an elongated bar that is non-compliant to bending in the device plane in order to couple translations along its length and is compliant to bending out-of-plane so that tilt motions of each resonator do not effectively couple into the other.

26. A MEMS gyroscope according to claim 21, wherein the resonators operate in anti-phase with one another, and wherein the coupling is an anti-phase coupling.

* * * * *